Dec. 16, 1930.  H. P. HICKERSON  1,785,259
VALVE CONSTRUCTION FOR SLUSH PUMPS
Filed Jan. 10, 1927
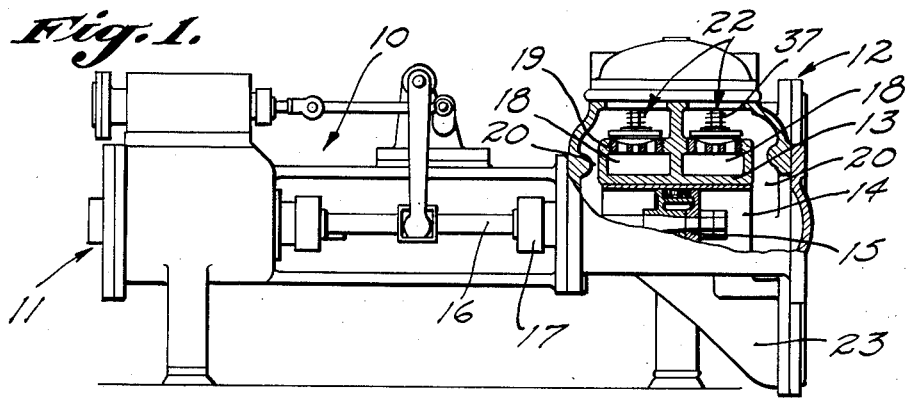
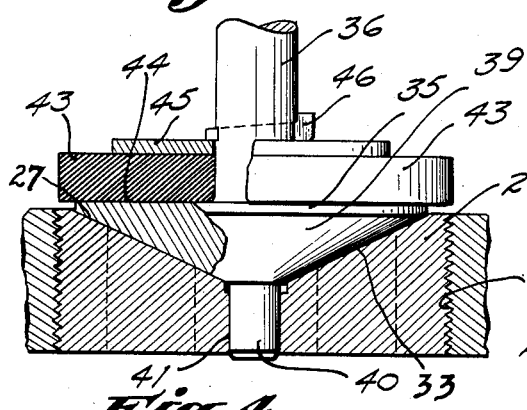
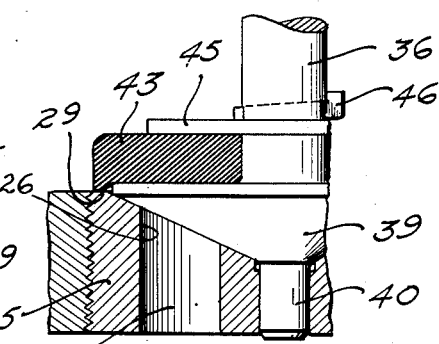
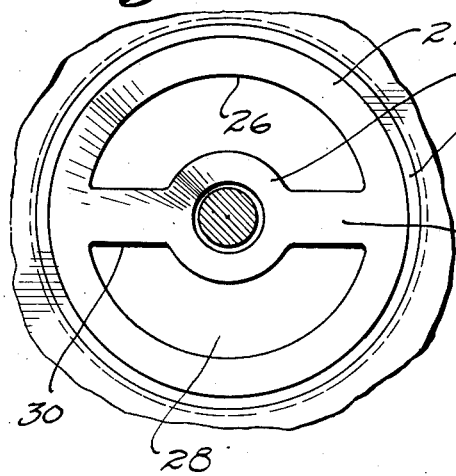
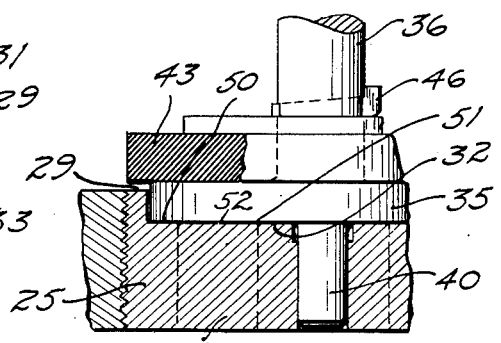
INVENTOR:
HENRY P. HICKERSON,
BY
ATTORNEY.

Patented Dec. 16, 1930

1,785,259

UNITED STATES PATENT OFFICE

HENRY P. HICKERSON, OF ANAHEIM, CALIFORNIA, ASSIGNOR TO ERNEST KOPPL, OF LONG BEACH, CALIFORNIA

VALVE CONSTRUCTION FOR SLUSH PUMPS

Application filed January 10, 1927. Serial No. 160,123.

My invention relates to valve constructions and relates particularly to a novel form of valve construction especially adapted for use in pumps which handle fluid carrying abrasive particles.

In the oil producing industry a slush pump is used to deliver slush or rotary mud under pressure to the drill bit which is operating at the bottom of the well. The slush or rotary mud carries abrasive particles which are very detrimental to the valves of the slush pump. In the ordinary valve construction the valve members engage an annular seat. The pounding action of the valve members against the seat is of considerable force and the parts quickly wear so that they must be replaced. I have discovered that the life of the valve construction may be greatly increased if the area of contact between the valve members and the valve seat is enlarged.

It is one of the objects of this invention to provide a valve construction in which the valve seat has an engaging face considerably larger in area than the ordinary valve seat, and which has as large a fluid passage as the ordinary valve seat. The results of this construction are that a better seal is provided and a valve of much longer life is had.

Another object of this invention is to provide a valve construction in which a seal is formed should any portion of the valve member fail to engage the valve seat.

A further object of this invention is to provide novel means for guiding the valve to centralized position, so that it will properly seat.

Other objects and advantages of the invention will be made evident hereinafter.

Referring to the drawing in which I illustrate my invention,

Fig. 1 is a view partially sectioned of a slush pump in which valve constructions of the invention are installed.

Fig. 2 is a vertical section of the invention, the valve member being seated.

Fig. 3 is a fragmentary section similar to Fig. 2 showing how the seal is formed.

Fig. 4 is a plan view of the seat.

Fig. 5 is a fragmentary section of an alternative form of the invention.

Referring to Fig. 1, the numeral 10 represents a slush pump having a steam end 11 and a slush end 12. The numeral 13 represents a cylinder in which a liner 14 is secured. Adapted to reciprocate horizontally in the liner 14 is a piston 15 which is attached to a piston rod 16. The piston rod 16 extends to the exterior of the cylinder 13 through a gland 17, and extends to the steam end of the slush pump 10. The slush pump shown in the drawing is a double-acting pump; that is, slush is pumped on both strokes of the piston 15. Intake passages 18 are formed above the liner 14, openings 19 being provided for communicating the intake passages 18 with chambers 20 which form a part of the cylinder 13. The flow of slush from the intake passages 18 through the openings 19 into the cylinder 13 is controlled by valve constructions 22 of this invention. The slush pump is provided with an outlet opening 23, but the details thereof and the details of an outlet valve of the pump are not shown since they do not concern the invention.

Referring to Figs. 2 to 4 inclusive, the valve construction 22 includes a seat member 25 which is screwed into the opening 19. The seat member 25 includes an annular wall 26 which provides an annular primary seat 27 which is beveled or frusto-conical in shape. The annular wall 26 also provides an annular flat seat 29. A fluid passage 28 is formed inside the annular wall 26. Extending across the fluid passage 28 is a wall 30 having a boss 31 formed at the central part thereof. The wall 30 has an upper face in the form of a secondary seat 33. The secondary seat 33 is beveled or frusto-conical and forms a continuation of the primary frusto-conical seat 27. The seats 27 and 33 are so formed that a frusto-conical valve member may properly seat thereon.

The valve construction 22 also includes a valve member 35 which is formed at the lower end of a valve stem 36. As shown in Fig. 1, a spring 37 surrounds each valve stem 36, this spring operating to resiliently close the valve construction. The valve member 35 provides a frusto-conical valve face 39 which, as shown in Figs. 2 and 3, is adapted to engage the primary and secondary seats 27 and 33. The tapered seat 27 functions to guide the valve 35 to centralized position, so that it will properly seat. Depending from the central part of the valve member 35 is a guide pin 40 which fits in a guide opening 41 formed vertically through the boss 31. A sealing member in the form of a resilient plate 43 surrounds the valve stem 36, engaging an upper face 44 of the valve member 35. The resilient plate 43 may be formed of rubber. A washer 45 and a key 46 are provided for holding the resilient plate 43 in proper position.

In the operation of the slush pump 10 the valve constructions 22, shown in Fig. 1, alternately open and close. When the piston 15 moves to the left, a suction is placed on the right chamber 20 and the right valve is lifted so that rotary mud or slush will pass from the right intake passage 18 into the right end of the liner 14. When the piston moves to the right a pressure is formed in the right chamber 20, and the valve member 35 by this pressure and by the action of the spring 37 is caused to quickly seat with a considerable pounding action. It is this pounding action of the ordinary valve construction that wears away the parts. In my invention the area of contact between the valve member 35 and the seat member 25 is greatly increased over that of the ordinary valve construction; for this reason the wear is distributed over a much larger surface and therefore will be less at any one point. In case a grain of sand or other obstruction should be caught between the valve face 39 and the primary or secondary seats 27 or 33 when the valve is seating, the valve member 35 will be held in a partially opened position and if the resilient plate 43 were not provided, there would be a leakage of fluid past the valve when the pressure in the right hand chamber 20 builds up. In order to prevent this leakage when the valve is held in a partially opened position, I provide the resilient plate 43. It is well known that when a fluid under pressure passes from a static to a moving state, the pressure thereof is reduced. Therefore, the fluid in the chamber 20 loses its pressure in passing from a relatively stationary state in the chamber 20 to a moving state in which it passes between the seat 29 and the resilient plate 43 and out through the valve. It should be noted that pressure of the static fluid acts on the top of the resilient member 43, and the pressure of the moving fluid adjacent to the seat 29 acts on the under side of the resilient member 43. Due to the difference between the static and moving pressures of the fluid, a differential of pressure is developed on the peripheral edges of the resilient plate 43 which causes these edges to be forced from a position as shown in Fig. 2 to a position as shown in Fig. 3 in which the lower edge of the resilient member 43 engages the flat seat 29 and effectively seals the valve. The pressure of the fluid then acts to hold the resilient member 43 in this position. When the valve seats properly as under normal operation, the resilient member 43 does not engage the seat 29, but remains in spaced relationship to the seat 29 as shown in Fig. 2. It is only when a portion of the valve is held from engaging the seats 27 and 33 that the resilient member 43 acts to effectively close the valve and prevent leakage.

In Fig. 5 I show an alternative form of the invention. In this form of the invention the structure is substantially the same, and the same numerals will apply to this figure as to the other figures of the drawing except as follows. The valve member 25 in Fig. 5 is countersunk so as to provide a flat primary seat 50 which is much below the flat face 29 thereof. The wall 30 provides a flat secondary seat 51 which is in alignment with the flat primary seat 50. The valve member 35 provides a flat valve face 52 which engages the primary and secondary faces 50 and 51. This form of the invention is shown to illustrate the manner in which modifications of the invention might be made.

As previously pointed out, a very important part of the invention is the enlarged area of contact between the valve member and the seat member for the purpose of prolonging the life of the valve construction. A very important consideration of the invention is that the fluid passage 28 is not any less in area than in the ordinary valve construction. The ordinary valve construction includes a cross bar having an opening into which a guide pin extends for centralizing the valve member. In my invention I utilize a cross bar for enlarging the area of the seat.

Another important part of the invention is the sealing member 43 which forms a tight seal in case the valve is held in a partially opened position.

I claim as my invention:

1. A valve construction for slush pumps comprising: a seating member having walls forming an annular primary seat, and forming a fluid passage; a wall extending across said passage, forming a secondary seat; a peripheral seat formed on said seating member, said seats being continuous; a metallic valve adapted to engage said primary and secondary seats; and a resilient sealing member carried by said valve and adapted to engage said peripheral seat.

2. A valve construction for slush pumps comprising: a seat; a valve adapted to engage said seat; and a resilient sealing member carried by said valve and being operable to engage said seating member should any portion of the valve fail to engage said seats but being normally substantially disengaged from said seating member.

3. A valve construction for slush pumps comprising: an annular seating member having a flat peripheral seat and a wall forming a primary bevelled seat and a fluid passage; a wall extending into said passage forming a secondary bevelled seat; a valve adapted to engage said primary and secondary bevelled seats; a guide integral with said valve and extending into an opening formed in the secondary beveled seat; a valve stem integral with said valve; a spring surrounding said stem and adapted to tension said valve toward said seating member; and a resilient sealing member carried by said valve and adapted for engaging said flat peripheral seat should any portion of said valve fail to engage said seats.

4. A valve construction comprising: a seating member having a peripheral seat; wall means forming an annular primary bevelled seat, and forming a fluid passage; a wall extending into said passage and forming a secondary bevelled seat; a valve adapted to engage said primary and secondary seats; and a resilient sealing member carried by said valve and adapted to engage said peripheral seat should any portion of said valve fail to engage said seats.

5. A valve construction comprising: a seating member having a peripheral seat; walls forming a primary seat, and forming a fluid passage; a beveled wall extending into said passage and forming a tapered secondary seat; a metallic valve adapted to engage said primary and secondary seats; and a resilient sealing member carried by said valve and adapted to engage said peripheral seat should any portion of said valve fail to engage said seats.

6. A valve construction comprising: a seating member having a peripheral seat; walls forming a primary bevelled seat, and forming a fluid passage; a wall extending across said passage, and forming a secondary bevelled seat; a valve adapted to engage said primary and secondary seats; and a resilient sealing member carried by said valve and adapted to engage said peripheral seat should any portion of said valve fail to engage said seats.

7. A valve construction comprising: a seat; a valve adapted to move to a seated position in which it engages said seat; and a resilient sealing member carried by said valve and being held in spaced relationship to said seat when said valve is seated, but being adapted to be seated should any portion of the valve fail to engage its seat.

8. In a valve adapted to control the flow of a fluid under pressure, the combination of: a seat; a valve adapted to move to a seated position in which it engages said seat; and a resilient sealing member carried by said valve and being held in spaced relationship to said seat when said valve is seated but adapted to be placed into seating engagement should any portion of the valve fail to engage its seat, opposite sides of said resilient sealing member being respectively acted upon by the static pressure of said fluid and by the pressure of said fluid adjacent said seat.

9. A slush pump valve construction, including: a seating member consisting of an outer annular portion surrounding a valve passage and having a primary conical face, and walls extending inwardly from said outer portion into said passage, said walls having secondary conical faces on the upper portions thereof; a closure body of relatively hard material having its lower part conically formed to engage said primary and secondary conical faces of said seating member; and an annular sealing member of resilient material carried by said closure body in position for engaging said seating member.

10. A slush pump valve construction, including: a seating member having an upper conical face all parts of which slope downwardly and inwardly, and having vertical openings extending downwardly from communication with said conical face and through said seating member; a closure body of relatively hard material having a lower conical face adapted to engage said upper conical face of said seating member; and a resilient sealing member carried by said closure body having an annular face adapted to engage said seating member.

11. A slush pump valve construction, including: a seating member of relatively hard material consisting of an outer annular portion, an inner portion, and walls extending from said outer portion to said inner portion, thereby providing a plurality of passages between said outer and inner portions, the upper portion of said outer annular portion being formed to provide a primary conical face, and the upper portions of said walls forming secondary conical faces; a closure body of relatively hard material having its lower part conically formed to engage said primary and secondary conical faces of said seating member; and an annular sealing member of resilient material carried by said closure body in position for engaging said seating member.

12. A slush pump valve construction, including: a seating member of relatively hard material consisting of an outer annular portion, an inner annular portion, and walls extending from said outer portion to said inner portion, thereby providing a plurality of passages between said outer and inner portions, the upper portion of said outer annular portion being formed to provide a primary conical face, and the upper portions of said walls forming secondary conical faces; a closure body of relatively hard material having its lower part conically formed to engage said primary and secondary conical faces of said seating member and having a central projection extended down into guiding engagement with said inner annular portion; and an annular sealing member of resilient material carried by said closure body in position for engaging said seating member.

13. A slush pump valve construction, including: a seating member of relatively hard material consisting of an outer annular portion, an inner annular portion, and walls extending from said outer portion to said inner portion, thereby providing a plurality of passages between said outer and inner portions, the upper portion of said outer annular portion being formed to provide a primary conical face, and the upper portions of said walls and said inner annular portion forming secondary conical faces; a closure body of relatively hard material having its lower part conically formed to engage said primary and secondary conical faces of said seating member and having a central projection extended down into guiding engagement with said inner annular portion; and an annular sealing member of resilient material carried by said closure body in position for engaging said seating member.

14. A slush pump valve construction, including: a seating member of relatively hard material consisting of an outer annular portion, an inner portion, and walls extending from said outer portion to said inner portion, thereby providing a plurality of passages between said outer and inner portions, the upper portion of said outer annular portion being formed to provide a primary conical face, and the upper portions of said walls forming secondary conical faces, said primary and secondary faces being conically aligned so as to form one continuous conical surface; a closure body of relatively hard material having its lower part conically formed to engage said primary and secondary conical faces of said seating member; and an annular sealing member of resilient material carried by said closure body in position for engaging said seating member.

15. A valve construction for slush pumps comprising: a seating member having primary and secondary seats of frusto-conical shape; a metallic valve adapted to engage said seats; a guide rigidly attached to said valve and extending into an opening formed in said secondary seat; and a resilient sealing member carried by said valve and being operable to engage said seating member should any portion of said valve fail to engage said seats.

16. A slush pump valve construction, including: a seating member consisting of an outer annular portion surrounding a valve passage and having a primary conical face, and walls extending inwardly from said outer portion into said passage, said walls having secondary conical faces on the upper portions thereof; a closure body of relatively hard material having its lower part conically formed to engage said primary and secondary conical faces of said seating member; and an annular sealing member of resilient material carried on the upper face of said closure body and having a peripheral edge portion projecting beyond the periphery of said closure body for making sealing engagement with said seating member.

17. A slush pump valve construction, including: a seating member of relatively hard material consisting of an outer annular portion, an inner portion, and walls extending from said outer portion to said inner portion, thereby providing a plurality of passages between said outer and inner portions, the upper portion of said outer annular portion being formed to provide a primary conical face, and the upper portions of said walls forming secondary conical faces; a closure body of relatively hard material having a central enlarged portion with a lower conical formation adapted to engage said primary and secondary faces of said seating member, an upwardly extending guide projection, and a downwardly extending guide projection; an annular sealing member on the upper face of said closure body and having a projecting peripheral portion for making sealing engagement with said seating member; and an annular securing plate surrounding said upwardly extending guide projection for holding said sealing member against the upper end of said central enlarged portion of said closure body.

18. As an article of manufacture, for use with a metallic valve seat having primary and secondary faces, a valve member comprising: a conical body of relatively hard metal for engagement with said primary and secondary faces of said seat; a pin secured to and extending upwardly from said conical body; an annular sealing member of resilient material on the upper face of said conical body and having a peripheral portion projecting beyond the upper edge of said conical body for sealing engagement with said valve seat; an annular plate for securing said sealing member to said conical body, said plate having an opening through which said guide pin projects; and a key operative between said pin and said plate for holding said plate in position on said conical body.

19. A valve construction for slush pumps comprising a seating member having primary and secondary seats forming separate fluid passages, said primary and secondary seats being continuous and being conical in formation, a conical valve, the surface of which engages the conical primary and secondary seats of the seating member, a guide extending downwardly from said valve member and rigidly connected therewith and extending into an opening formed in said conical secondary seat and a stem extending upwardly from said valve, a resilient sealing member secured to said stem and maintained in engagement with said valve and overlying the periphery thereof and operable to seal the passageway between the valve and seat in the event that the valve is imperfectly seated.

20. A valve construction comprising a seating member having an annular primary seat, a transversely disposed wall extending across the hollow confines of said seating member and dividing the same into a plurality of passageways, said wall being dished to a conical formation and constituting a secondary seat, a conical valve adapted to engage said primary and secondary seats, a guide attached to said conical valve at the apex thereof and depending downwardly therefrom and extending into an opening formed in said wall, a valve stem rigidly secured to the conical valve and extending upwardly therefrom, and a resilient sealing member of greater diameter than said valve secured to said stem and overlying the peripheral edges of the valve and adapted to engage said seating member and operable to seal the passageway between the valve and seat in the event that the valve is imperfectly seated.

In testimony whereof, I have hereunto set my hand at Los Angeles, California, this 3rd day of January, 1927.

HENRY P. HICKERSON.